(12) United States Patent
Nurmi

(10) Patent No.: US 7,587,087 B2
(45) Date of Patent: Sep. 8, 2009

(54) ON-LINE HANDWRITING RECOGNITION

(75) Inventor: Mikko Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 768 days.

(21) Appl. No.: 11/010,062

(22) Filed: Dec. 10, 2004

(65) Prior Publication Data

US 2006/0126937 A1    Jun. 15, 2006

(51) Int. Cl.
*G06K 9/00* (2006.01)

(52) U.S. Cl. .................. 382/187; 382/188; 382/189; 382/290; 382/314; 345/173; 345/467; 178/18.03

(58) Field of Classification Search .............. 382/187, 382/189, 186, 179, 185, 188, 160, 228, 202, 382/226, 209, 190, 225, 177, 195, 161, 229, 382/197, 181, 289, 290, 314; 341/33, 5; 178/18.01, 18.03, 19.04; 345/173, 179, 702, 345/163, 169, 183, 467; 235/472.01; 358/473
See application file for complete search history.

(56) References Cited

U.S. PATENT DOCUMENTS

| 5,550,931 A | * | 8/1996 | Bellegarda et al. | 382/187 |
| 5,926,566 A | * | 7/1999 | Wang et al. | 382/185 |
| 6,512,838 B1 | * | 1/2003 | Rafii et al. | 382/106 |
| 6,647,145 B1 | * | 11/2003 | Gay | 382/187 |
| 6,694,056 B1 | * | 2/2004 | Ito et al. | 382/186 |

* cited by examiner

*Primary Examiner*—Sheela C Chawan
(74) *Attorney, Agent, or Firm*—Alfred A. Fressola; Ware, Fressola, Van Der Sluys & Adolphson, LLP

(57) ABSTRACT

The invention relates to on-line handwriting recognition. At least one auxiliary line is displayed on a touch sensitive panel. Each of the auxiliary lines constitutes a portion of more than one character of a character set. A character of the character set is drawn on the touch sensitive panel by completing one of the at least one auxiliary line into the character. The drawn character is recognized on the basis of said completion. The invention allows handwriting recognition that is significantly more reliable and easier to use than prior art techniques.

9 Claims, 5 Drawing Sheets

ON-LINE HANDWRITING RECOGNITION

BACKGROUND OF THE INVENTION

1. Field of the Invention

The invention relates to handwriting recognition. In particular, the invention relates to on-line handwriting recognition in a novel and improved way.

2. Description of the Related Art

The term "handwriting recognition" refers to a feature of a computer device or corresponding to receive intelligible written input. Handwriting recognition is often classified in two categories: off-line handwriting recognition and on-line handwriting recognition.

In off-line handwriting recognition, an image of written text is sensed e.g. from a piece of paper typically by means of optical scanning. Characters included in the written text are then recognized from the scanned image typically by means of suitable software.

In on-line handwriting, recognition text is written on e.g. a touch sensitive screen surface with e.g. a pen or a stylus, and the movements of the pen or stylus are sensed on-line. Characters drawn with the pen or stylus are interpreted or recognized by a software application. The touch sensitive screen may e.g. be integrated with an output display, or it may e.g. be adjacent to the output display. On-line handwriting recognition has proven particularly popular in various handheld devices, such as personal digital assistants (PDA), tablet personal computers (tablet PC), and lately also mobile telephones. The term "tablet PC" refers to a type of notebook computer that is equipped with a digitizer tablet and a stylus, and allows a user to handwrite text with the stylus.

Prior art on-line handwriting recognition techniques can be broadly categorized into three groups. The first group consists of techniques in which a user writes text more or less as usual, and a software application tries to learn the writing patterns of the user. An example of this technique is the handwriting recognition used by a personal digital assistant known as Apple Newton™.

The second group consists of techniques in which a set of pen strokes is predefined for each character. To draw a character, the user does not write as usual. Rather, the user must draw the predefined pen strokes. Examples of this technique include a recognition system known as Graffiti® and used earlier in personal digital assistants by Palm, and a recognition system known as JOT® by Communication Intelligence Corporation which is also used in various personal digital assistants including these days those by Palm. This second group of on-line handwriting recognition techniques is sometimes called character based handwriting recognition.

The third group consists of techniques in which a recognition system maintains a database of possible, typically thousands, shapes for each character. The system does not attempt to learn the writing patterns of the user, nor is the user required to draw predefined pen strokes. Rather, the user draws a character as he normally would, and the system searches the database for the closest match. An example of this technique is the handwriting recognition used in Microsoft Windows XP® operating system for tablet PCs.

However, all these prior art techniques have their problems. The first group of techniques requires the system to learn the writing patterns of the user. In practice this has proven extremely difficult and the existing applications tend to be unreliable. The second group of techniques requires the user to draw predefined patterns. Therefore the user is required to memorize these predefined patterns in order to be able write. The third group of techniques requires the system to maintain an extensive database, which is particularly problematic for compact handheld devices, which simply may not have enough resources for database maintenance and searches. Furthermore, the prior art techniques typically require the user to draw blindly. That is, the user cannot see the character as it is being drawn, even though some applications may provide a baseline or underline upon which to draw the actual character. Furthermore, the prior art techniques are particularly disadvantageous in situations where the user is being shaken or is otherwise moving. Such situations include for example a user riding a bus and trying to write on his personal digital assistant. Trying to draw predefined patterns blindly in such a situation is extremely difficult.

Therefore, the object of the present invention is to alleviate the problems described above and to introduce a solution that allows handwriting recognition that is both more reliable and easier to use than before.

SUMMARY OF THE INVENTION

A first aspect of the present invention is an on-line handwriting recognition method in which at least one auxiliary line is displayed on a touch sensitive panel. Each of the at least one auxiliary line constitutes a portion of more than one character of a character set. A character of the character set is drawn on the touch sensitive panel by completing one of the at least one auxiliary line into the character. The drawn character is recognized on the basis of the completion.

A second aspect of the present invention is a device for on-line handwriting recognition. The device comprises a touch sensitive panel for displaying at least one auxiliary line, each of the at least one auxiliary line constituting a portion of more than one character of a character set. The device further comprises a handwriting recognizer for recognizing a character of said character set drawn on said touch sensitive panel by completing one of said at least one auxiliary line into said character.

In an embodiment of the invention, the device further comprises a drawing instrument for drawing a character of said character set on said touch sensitive panel by completing one of said one or more auxiliary lines into said character.

A third aspect of the present invention is a device for on-line handwriting recognition. The device comprises a touch sensitive input/output means for displaying at least one auxiliary line, each of the at least one auxiliary line constituting a portion of more than one character of a character set. The device further comprises a handwriting recognition means for recognizing a character of said character set drawn on said touch sensitive input/output means by completing one of said at least one auxiliary line into said character.

In an embodiment of the invention, the device further comprises a drawing means for drawing a character of said character set on said touch sensitive input/output means by completing one of said at least one auxiliary line into said character.

A fourth aspect of the present invention is a computer program embodied on a computer readable medium for on-line handwriting recognition. The computer program controls a data-processing device to perform the step of recognizing a character of a character set drawn on a touch sensitive panel, the character having been drawn by completing one of at least one auxiliary line into the character, the at least one auxiliary line being displayed on the touch sensitive panel and each of the at least one auxiliary line constituting a portion of more than one character of the character set, and the recognizing being performed on the basis of the completion.

In an embodiment of the invention, the at least one displayed auxiliary line includes at least one of a first auxiliary line essentially in the form of a vertical line, a second auxiliary line essentially in the form of letter "C" and a third auxiliary line essentially in the form of "ɔ". The vertical line may be e.g. perpendicular, or it may be leaning e.g. slightly forwards, i.e. essentially in the form of a slash character "/".

The invention allows handwriting recognition that is both more reliable and easier to use than before. The user is not required to draw blindly, nor is the user required to memorize any predefined patterns. Rather, the user simply completes a pre-displayed auxiliary line into the intended character. Thus, handwriting recognition in accordance with the principles of the present invention is significantly easier to use than prior art handwriting recognition techniques. Furthermore, no system, device, or software application is required to learn the writing patterns of the user. Thus, handwriting recognition in accordance with the principles of the present invention is significantly more reliable than prior art handwriting recognition techniques.

The reliability of the handwriting recognition in accordance with the principles of the present invention is further enhanced by the fact that the user typically only draws little parts of a character in order to complete the character thus minimizing the probability of mistakes and non-intelligibly drawn patterns. The reliability of the handwriting recognition in accordance with the principles of the present invention is still further enhanced by the fact that the starting point of the completion typically limits the possibilities of which character the user intends to draw thus facilitating correct recognition. For example, if the user starts to draw a horizontal line extending from the base of an auxiliary vertical line to the right, the software application is able to immediately deduce that the user intends draw either letter E, L or Z. Due to the enhanced reliability of the handwriting recognition, the invention is particularly suitable for use in situations in which the user and/or the device which the user is writing on is vibrating or trembling for some reason and thus the user is not able to write as clearly as normally.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
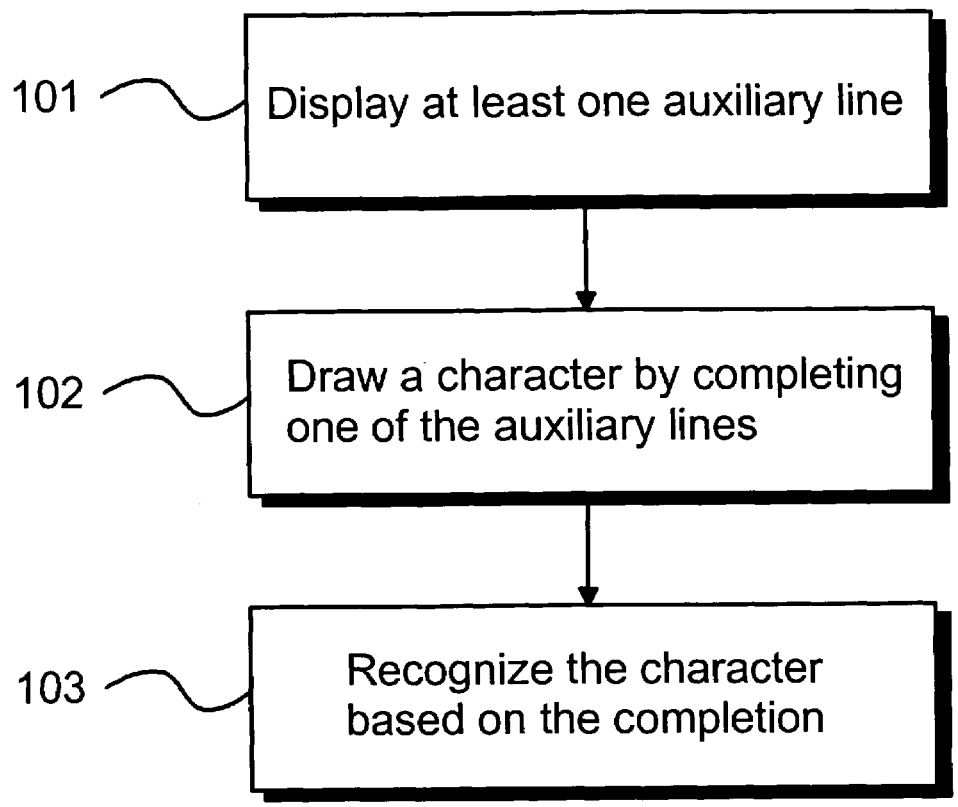
FIG. 1 is a flow diagram illustrating a method according to an embodiment of the present invention.

FIG. 1 illustrates an exemplary embodiment of the method of the present invention relating to on-line handwriting recognition. At step 101 at least one auxiliary line is displayed on a touch sensitive panel. Each of the at least one auxiliary line constitutes a portion of more than one character of a character set. That is, each auxiliary line has been pre-selected so that the auxiliary line is a part of at least two characters. The more characters of the character set a single auxiliary line is a part of, the more characters can be drawn by completing the auxiliary line.

A character of the character set is drawn on the touch sensitive panel by completing one of the at least one auxiliary line into the intended character, step 102. In other words, only the missing parts of the intended character are drawn by the user around the auxiliary line. The drawn character is then, at step 103, recognized on the basis of the completion. That is, the drawn character is recognized on the basis of the parts the user drew.

Figure 2:
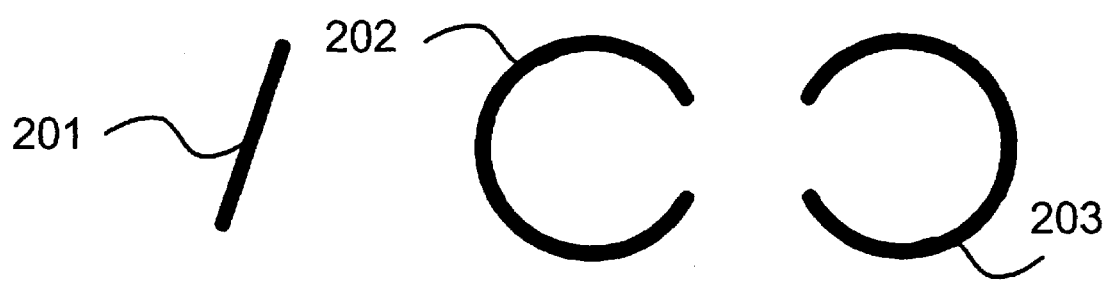
FIG. 2 illustrates three exemplary auxiliary lines according to an embodiment of the present invention.

FIGS. 2 and 4a-4c further illustrate the use auxiliary lines and how to complete them into characters according to an exemplary embodiment of the present invention. FIG. 2 discloses a first auxiliary line 201, which is essentially in the form of a vertical line, a second auxiliary line 202 essentially in the form of letter "C" and a third auxiliary line 203 essentially in the form of "ɔ". As can be seen, in the exemplary embodiment of FIGS. 2 and 4a-4b, the vertical auxiliary line 201 is leaning slightly forwards, i.e. it is essentially in the form of a slash character. However, the vertical auxiliary line may as well be e.g. perpendicular.

Figure 4A:
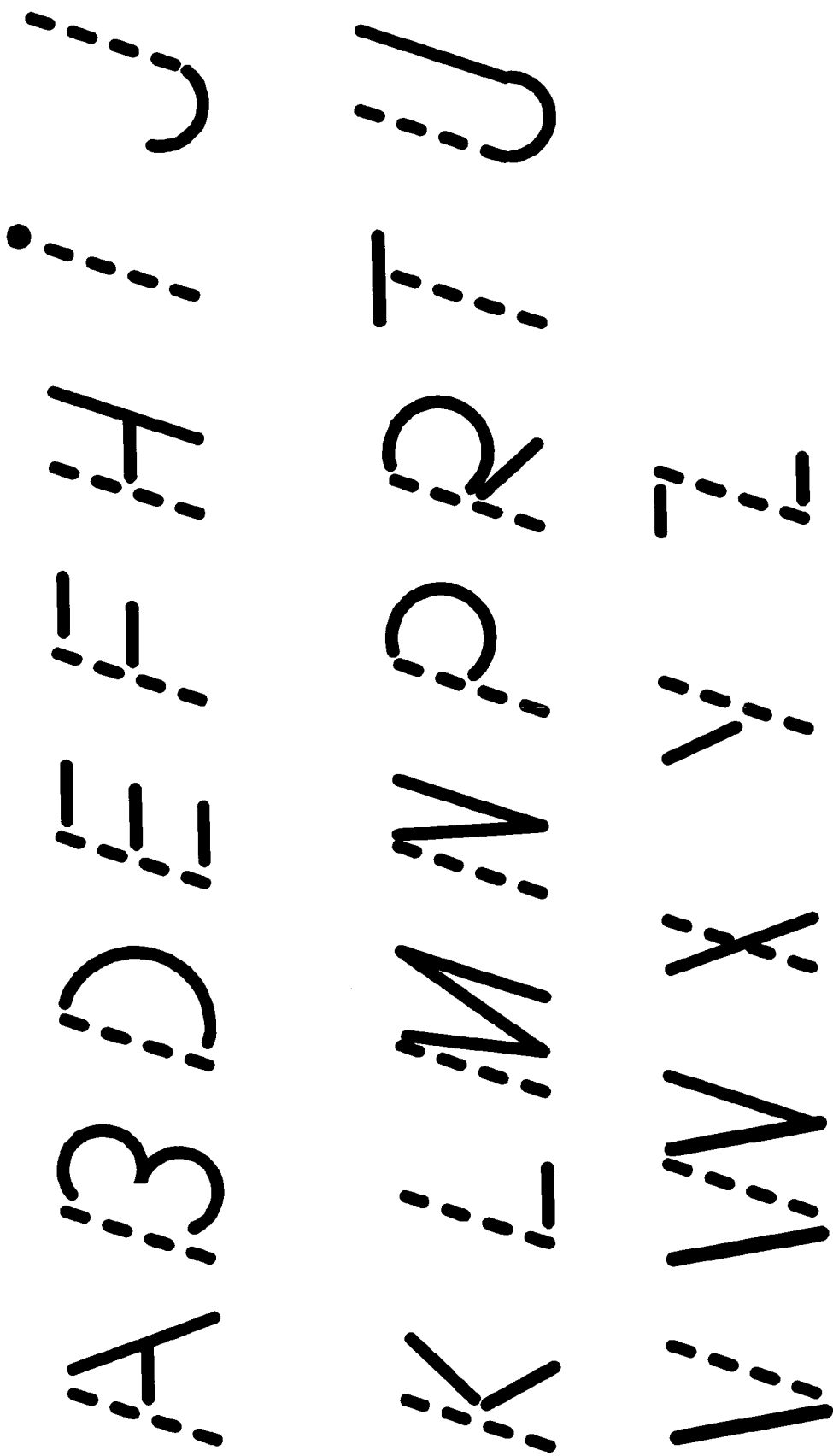
FIG. 4a illustrates completion of various characters based on an auxiliary line essentially in the form of a vertical line according to an embodiment of the present invention.
Figure 4B:
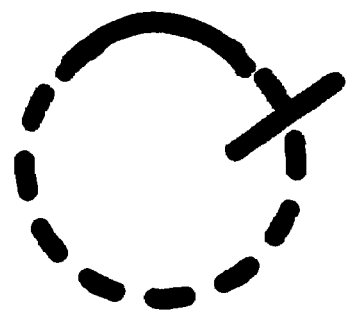
FIG. 4b illustrates completion of various characters based on an auxiliary line essentially in the form of letter "C" according to an embodiment of the present invention.
Figure 4B:
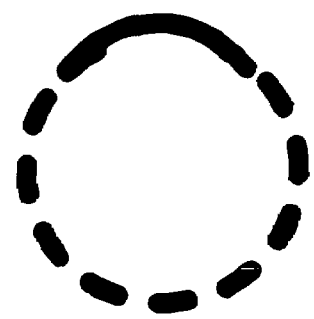
Figure 4B:
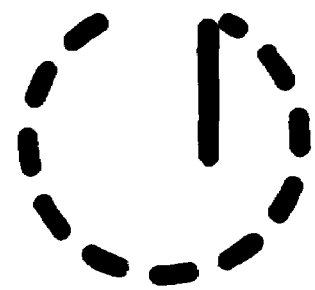
Figure 4B:
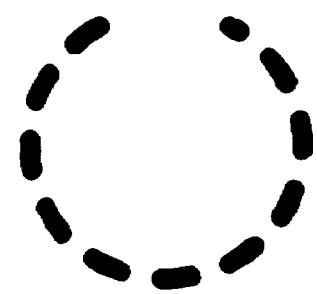

FIG. 4a illustrates how to complete the vertical auxiliary line 201 of FIG. 2 into various upper case letter characters. The dash line represents the pre-displayed vertical auxiliary line 201 of FIG. 2, and the solid lines represent the various parts of the various characters the user needs to draw. Correspondingly, FIG. 4b illustrates how to complete the second auxiliary line 202 of FIG. 2 into various upper case letter characters. The dash line represents the pre-displayed second auxiliary line 202 of FIG. 2, and the solid lines represent the various parts of the various characters the user needs to draw. As can be seen from FIGS. 4a-4b, utilizing just the two exemplary auxiliary lines of FIG. 2, most upper case western letter characters can easily be drawn. For example, letter "I" can be drawn by adding a dot on top of the pre-displayed vertical auxiliary line 201 of FIG. 2. Letter "L" can be drawn by adding a short horizontal line to the right of the base of the pre-displayed vertical auxiliary line 201 of FIG. 2. Letter "O" can be drawn by closing the gap of the pre-displayed second line 202 of FIG. 2.

Figure 4C:
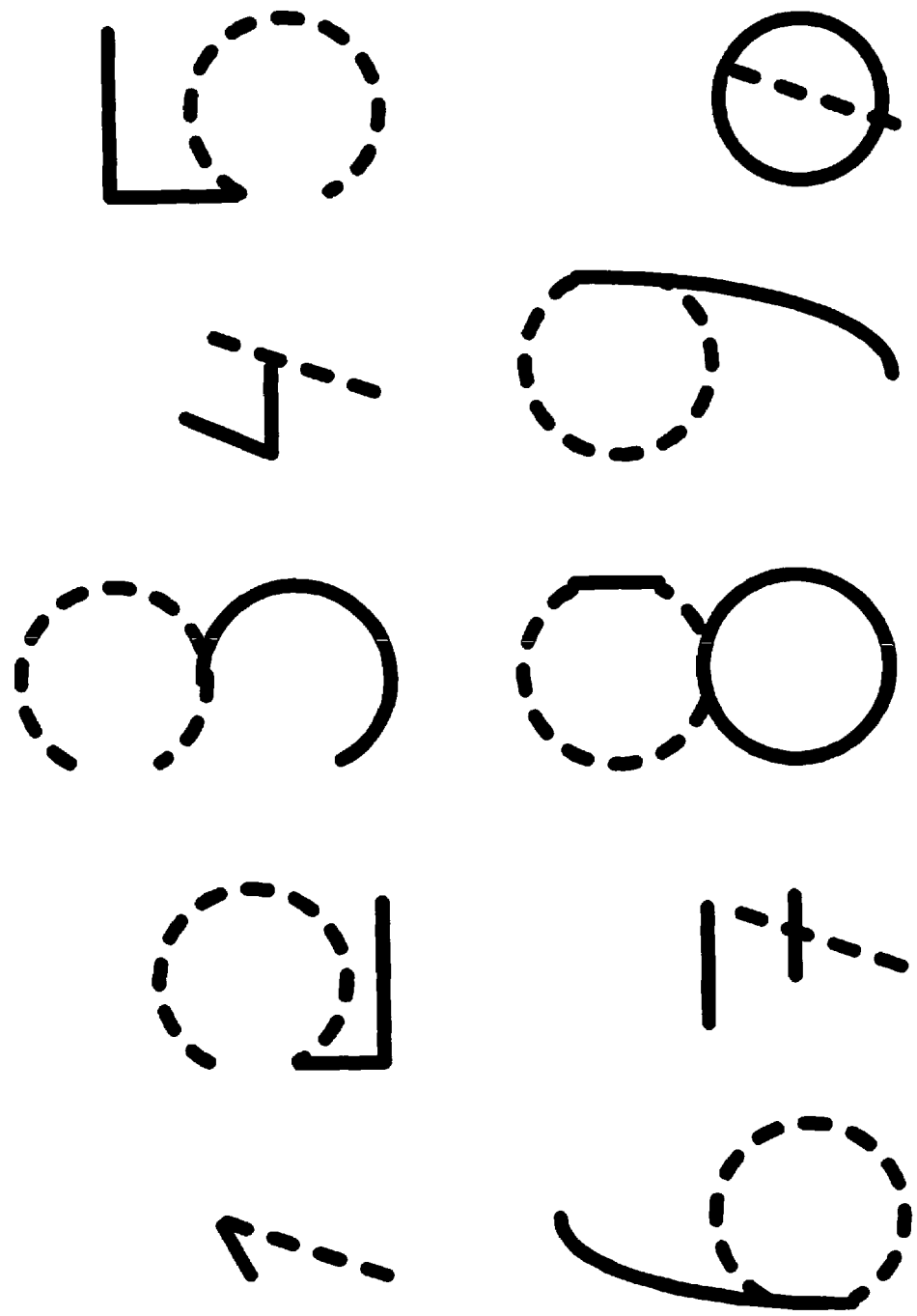
FIG. 4c illustrates completion of numerals based on auxiliary lines according to an embodiment of the present invention.

FIG. 4c illustrates how to complete numerals by using the aforementioned auxiliary lines. It should be noted that FIG. 4c illustrates only one embodiment how to use the auxiliary lines.

Figure 3:
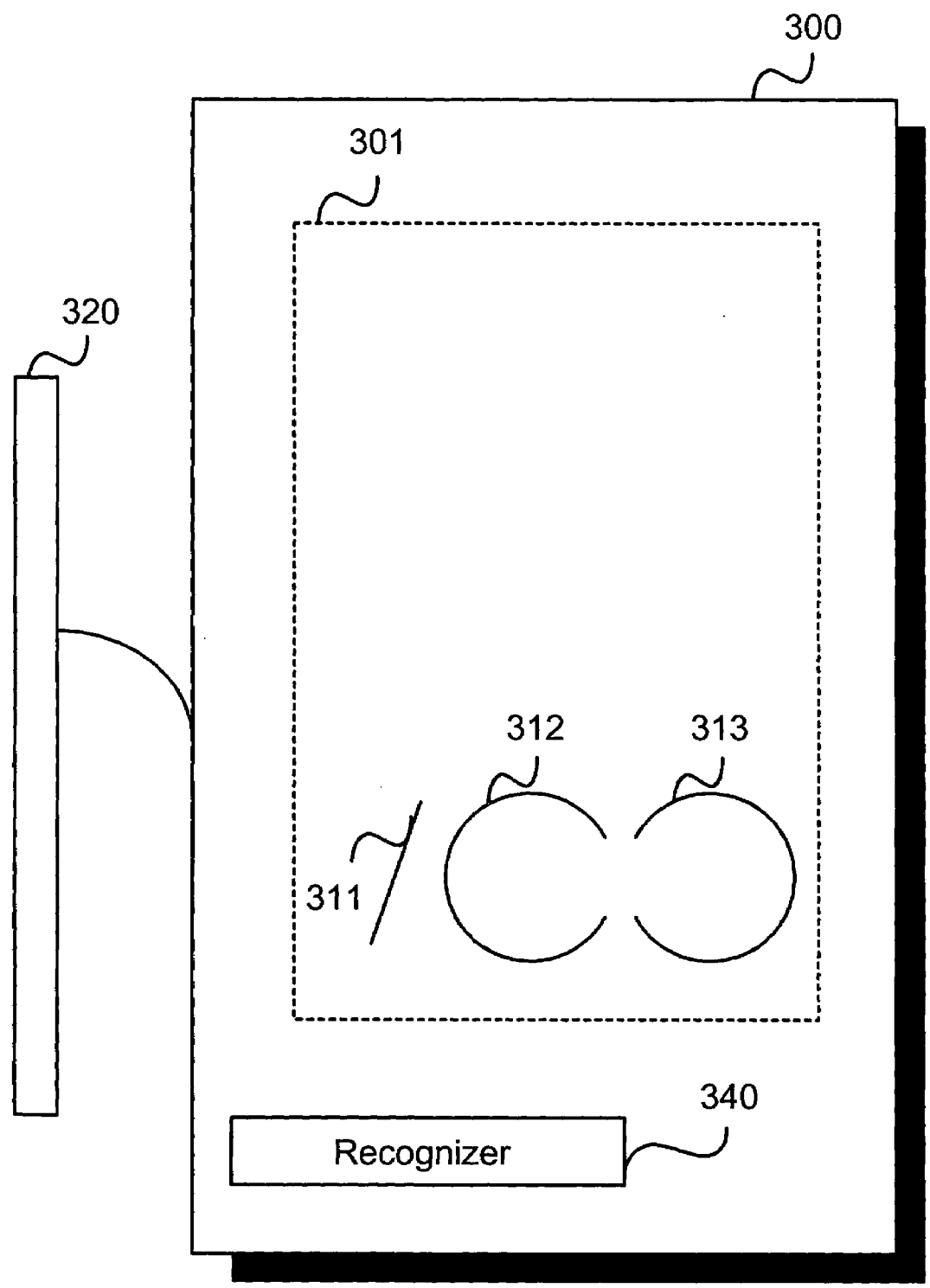
FIG. 3 is a block diagram illustrating a device according to an embodiment of the present invention.

FIG. 3 illustrates an exemplary embodiment of the device of the present invention relating to on-line handwriting recognition. The device 300 comprises a touch sensitive panel 301 for displaying two auxiliary lines 311 and 312, each of which constitutes a portion of more than one character of a character set. The device 300 further comprises a drawing instrument 320 for drawing a character of the character set on the touch sensitive panel by completing one of the two auxiliary lines into the intended character. In another embodiment of the invention, characters may be drawn using e.g. a finger, and therefore, the drawing instrument 320 may not be needed. The device 300 further comprises a handwriting recognizer 340 for recognizing the drawn character on the basis of the completion.

In the exemplary embodiment of FIG. 3, the device 300 is a handheld device, such as a personal digital assistant or a mobile telephone. In the exemplary embodiment of FIG. 3, the touch sensitive panel 301 is a display screen at the bottom of which the three auxiliary lines 311, 312 and 313 are located. However, the touch sensitive panel may as well be an element separate from a display, as is known to those skilled in the art. The auxiliary lines 311, 312 and 313 may be fixed, e.g. painted on the display screen 301, or they may be drawn on the display screen 301 by the device 300 in the same manner as everything else presented on the display. In the exemplary embodiment of FIG. 3, the drawing instrument 320 is a pen or a stylus with which the user may write on the touch sensitive display screen 301. In the exemplary embodiment of FIG. 3, the handwriting recognizer 340 is implemented as a software application. However, the handwriting recognizer 340 may as well be implemented in hardware, or as a combination of hardware and software.

When writing text, the user simply completes one of the auxiliary lines 311, 312 or 313 into the intended characters one character at a time. For example, if writing the word "NOKIA", the user first completes auxiliary line 311 into letter "N" in the manner illustrated in FIG. 4a. Then, the user completes auxiliary line 312 into letter "O" in the manner illustrated in FIG. 4b. Then, the user completes auxiliary line 311 into letter "K" in the manner illustrated in FIG. 4a. Then, the user completes auxiliary line 311 into letter "I" in the manner illustrated in FIG. 4a. Finally, the user completes auxiliary line 311 into letter "A" in the manner illustrated in FIG. 4a.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method comprising:
    pre-displaying at least one auxiliary line on a touch sensitive panel of a device, each of said at least one auxiliary line constituting a portion of more than one character of a character set; and
    recognizing by said device, a drawn character of said character set on the basis of completion of said at least one auxiliary line on said touch sensitive panel into said character.

2. The method according to claim 1, wherein said pre-displaying further comprises at least one of pre-displaying a first auxiliary line essentially in the form of a vertical line, pre-displaying a second auxiliary line essentially in the form of letter "C" and pre-displaying a third auxiliary line essentially in the form of "ɔ".

3. A device comprising:
    a touch sensitive panel configured to pre-display at least one auxiliary line, each of said at least one auxiliary line constituting a portion of more than one character of a character set; and
    a handwriting recognizer configured to recognize a character of said character set drawn on said touch sensitive panel by completing one of said at least one auxiliary line into said character.

4. The device according to claim 3, wherein the touch sensitive panel is configured to pre-display at least one of a first auxiliary line essentially in the form of a vertical line, pre-displaying a second auxiliary line essentially in the form of letter "C" and pre-displaying a third auxiliary line essentially in the form of "ɔ".

5. The device according to claim 3, wherein the device further comprises a drawing instrument for drawing a character of said character set on said touch sensitive panel by completing one of said one or more auxiliary lines into said character.

6. A device comprising:
    means for pre-displaying at least one auxiliary line on a touch sensitive device, each of said at least one auxiliary line constituting a portion of more than one character of a character set; and
    means for recognizing a character of said character set drawn on said touch sensitive input/output means by completing one of said at least one auxiliary line into said character.

7. The device according to claim 6, wherein the means for pre-displaying pre-displays at least one of a first auxiliary line essentially in the form of a vertical line, pre-displays a second auxiliary line essentially in the form of letter "C" and pre-displays a third auxiliary line essentially in the form of "ɔ".

8. The device according to claim 6, wherein the device further comprises means for drawing a character of said character set on said touch sensitive device by completing one of said at least one auxiliary line into said character.

9. A computer readable medium stored with instructions for execution by a processor, which when executed, performs:
    recognizing a character of a character set drawn on a touch sensitive panel, said character having been drawn by completing one of at least one auxiliary line into said character, said at least one auxiliary line being pre-displayed on said touch sensitive panel and each of said at least one auxiliary line constituting a portion of more than one character of said character set, and said recognizing being performed on the basis of said completion.

* * * * *

UNITED STATES PATENT AND TRADEMARK OFFICE
CERTIFICATE OF CORRECTION

PATENT NO. : 7,587,087 B2
APPLICATION NO. : 11/010062
DATED : September 8, 2009
INVENTOR(S) : Mikko Nurmi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1304 days.

Signed and Sealed this

Twenty-first Day of September, 2010

David J. Kappos
*Director of the United States Patent and Trademark Office*